United States Patent [19]
Wilson

[11] Patent Number: 6,053,958
[45] Date of Patent: Apr. 25, 2000

[54] PROCESS FOR PREPARATION OF FERTILIZER CONTAINING SLAG

[76] Inventor: Harold W. Wilson, 6985 Market Ave., El Paso, Tex. 79915

[21] Appl. No.: 09/084,601

[22] Filed: May 27, 1998

[51] Int. Cl.$^7$ .............................. C05D 1/00; C21B 11/10
[52] U.S. Cl. ................................. 71/62; 71/63; 75/10.63
[58] Field of Search ......................... 71/62, 63; 75/10.63

[56] References Cited

U.S. PATENT DOCUMENTS

| | | |
|---|---|---|
| 300,720 | 6/1884 | Mitchell . |
| 2,604,461 | 7/1952 | Roth ........................................ 260/79.3 |
| 2,757,193 | 7/1956 | Zoppa ...................................... 260/503 |
| 2,778,809 | 1/1957 | Mussell et al. ........................... 260/41 |
| 2,927,851 | 3/1960 | Wilson ...................................... 71/62 |
| 3,056,765 | 10/1962 | Cowherd et al. ...................... 260/79.3 |
| 3,145,093 | 8/1964 | Wilson ...................................... 71/62 |
| 3,201,222 | 8/1965 | Wilson ...................................... 71/45 |
| 3,269,831 | 8/1966 | Wilson ...................................... 75/108 |
| 3,273,997 | 9/1966 | Wilson ...................................... 75/108 |
| 3,288,597 | 11/1966 | Wilson ...................................... 75/108 |
| 3,418,238 | 12/1968 | Wilson ...................................... 252/1 |
| 3,467,515 | 9/1969 | Wilson ...................................... 71/37 |
| 3,632,308 | 1/1972 | Klein ......................................... 23/125 |
| 3,860,409 | 1/1975 | Wilson ...................................... 71/62 |
| 3,868,440 | 2/1975 | Lindblad et al. ......................... 423/41 |
| 4,077,923 | 3/1978 | Tanaka et al. ........................... 270/2.3 |
| 5,085,681 | 2/1992 | Boukidis ................................... 71/29 |
| 5,470,370 | 11/1995 | Lonchamp et al. ...................... 71/25 |
| 5,573,674 | 11/1996 | Lind et al. .............................. 210/702 |
| 5,584,905 | 12/1996 | Wilson ...................................... 71/14 |

OTHER PUBLICATIONS

The Yearbook of Agriculture 1957, U.S. Dept. of Agriculture, Washington, D.C., p. 286.

Traynor, S., "Turpentine From Sailing Ships To The Ozone Hole" pp. 16,17.

Sauchelli, V., Manual On Fertilizer Manufacture, Second Edition, Davision Chemical Company, Baltimore, Md., p. 76.

Kimball, B.A., et al, "Effects of Elevated CO2", Journal of Soil & Water Conservation, Jan.–Feb. 1993, vol. 48, No. 1, pp. 10–13.

Deterioration of Materials, Reinhold Publishing Corporation, N.Y., 1954, pp. 576–581.

*Primary Examiner*—Gary P. Straub
*Attorney, Agent, or Firm*—Jacobson, Price, Holman & Stern, PLLC

[57] ABSTRACT

Soil fertilizing and soil improving products may be made by a process which comprises admixing a pulverized waste copper slag with concentrated sulfuric acid having a strength of about 93.17% by weight in the total absence of added water whereby the resulting slag-acid composition reacts to form a dry granular product.

17 Claims, No Drawings

PROCESS FOR PREPARATION OF FERTILIZER CONTAINING SLAG

BACKGROUND OF THE INVENTION

1. Field of the Invention

The present invention relates to a fertilizer material for soils and, more particularly, to an acidulated slag fertilizer.

2. Description of the Prior Art

Highly acidic fertilizers for soils made from iron and copper refining slags are already well known. However, there has been a continuing need to develop fertilizers, and processes for making same, which have increased acidity and which will release their acidity to the soil over an extended period of time.

Processes for making acidic fertilizers from reverberatory copper refining slag by treatment thereof with acid are taught in my earlier U.S. Pat. Nos. 2,927,851 and 3,145,093. In the former patent, the slag is treated with concentrated sulfuric acid in the presence of relatively large quantities of water. In the latter patent, dry (non-wetted) slag is treated with hot, dilute aqueous solutions of sulfuric acid. In both processes, the reaction between the water present, the acid and the slag is virtually instantaneous and only partial chemical decomposition of the oxidic-silicic components of the slag takes place with the result that the products still contain substantial amounts of acid reactable, but unreacted, residues.

My U.S. Pat. No. 3,201,222 relates to a product suitable for the treatment of both alkaline and acid soils. The product may be formed by reacting slag materials such as that obtained from the process of refining copper in a reverberatory furnace with a suitable amount of concentrated orthophosphoric acid, without the separate addition of any extra water, and by thereafter maintaining the product resulting from the slag-acid reaction at an elevated temperature for a time interval sufficient to permit all of the iron values originally present in the slag, both as metallic iron and as various iron oxides, to be converted to iron salts of orthophosphoric acid.

In my U.S. Pat. No. 3,418,238, I describe a process for the preparation of a modified silica gel derived from mineral acid extracts of waste slag resulting from the reverberatory refining of copper pyritic type ores which comprises treating the slag with an aqueous solution of at least one mineral acid to dissolve the acid-soluble portion of the slag under conditions whereby the temperature of the slag-acid system does not generally exceed 175° F. so that the formation of a silica gel is avoided, separating the resulting mineral acid solution from the solid and insoluble residue, modifying the silicic acid dihydrate containing solution by the addition of chemicals to be carried by the silica and altering the hydrogen ion concentration of the silicic acid dihydrate by driving off water so as to convert the silicic acid dihydrate to silicic acid monohydrate at which point the system gels to provide a modified silica gel which acts as a carrier for the added chemicals.

Soil fertilizing and soil improving gel products are disclosed in my U.S. Pat. No. 3,860,409. The products may be made by a process which comprises admixing a pulverized waste copper slag with concentrated sulfuric acid having a strength of from 95 to 98% by weight and adding limited quantities of water to the acid wetted slag whereby the resulting slag-acid-water composition reacts to form a dry granular aggregate composed of about 80–85% water soluble partially hydrated, but mostly anhydrous, metallic sulfate salts in combination with metasilicic acid-adsorbed sulfuric acid, about 15–20% sulfuric acid insoluble metal silicates, and approximately 1–2% of elemental sulfur.

SUMMARY OF THE INVENTION

It is an object of the present invention to provide a process for causing substantially all of the acid reactable components of the pulverized waste slag to react with the sulfuric acid.

It is another object of the present invention to provide a process for preparing acid containing fertilizer slag wherein the acid salts are anhydrous and therefore the acidity is high.

It is still another object of this invention to provide a highly acidic fertilizer slag having an extended life in soil whereby it will provide more available acidity for a longer period of time.

Other objects and advantages of the present invention will become apparent from the following description and appended claims.

Briefly stated, in accordance with the aforesaid objects, the present invention provides a process for making soil fertilizing and soil improving products comprising the steps of admixing a pulverized waste copper slag with concentrated sulfuric acid having a strength of about 93.17% by weight to thoroughly wet the slag in the total absence of added water to permit substantially all of the acid reactable components of the slag to react with the acid. The result is formation of dried granular products containing large quantities of acid. The fertilizer products resulting from the process of the present invention consist essentially of dry, granular aggregates which are substantially anhydrous.

DETAILED DESCRIPTION OF THE INVENTION

The slag which forms the starting material for the acidic fertilizer is a slag obtained from the refining of copper ores by use of the reverberatory refining process and has essentially the following general composition: total iron expressed as Fe metal— 15 to 35%; silica—25 to 40%; calcium oxide—8 to 10%; aluminum oxide—6 to 8%; magnesium oxide—1½ to 3%; zinc—2 to 3%; manganese oxide—approximately 1%; and usually less than 1% each of copper, lead, and sulfur, with trace amounts of elements such as boron, molybdenum, nickel, gold and silver. Preferably, the pulverized slag particles will all pass a 200 mesh (U.S. Standard Sieve) screen. This distribution is advantageous since it assures sufficiently small particles to be readily wetted on admixture with the concentrated acid, yet with a substantial absence of fine particles.

According to the present process, pulverized slag particles are exposed initially to treatment with concentrated sulfuric acid containing about 93.17% $H_2SO_4$ by weight in the absence of water other than the minor content found present in the pulverized slag particles and the concentrated acid. The particles are well mixed with the concentrated acid to thoroughly wet the particles.

The use of conventionally available substantially 66° Be concentrated sulfuric acid (about 93.17% $H_2SO_4$) is critical to the successful achievement of the goals of the invention. The use of "ordinary" concentrated sulfuric acid (98.5% $H_2SO_4$) as such is totally unsuitable, as likewise are any diluted sulfuric acids having $H_2SO_4$ contents of less than 93%.

In contrast to the technique disclosed in my U.S. Pat. No. 3,860,409, the resultant slag-acid mixture is not combined with limited amounts of water to cause chemical reaction to take place between all or nearly all of the acid-reactable components of the slag and the sulfuric acid in the presence of limited amounts of water. Rather, no water is added to the resultant slag-acid mixture.

The about 66° Be concentrated sulfuric acid (about 93.17% $H_2SO_4$) is mixed with the slag in a total absence of any added water until the mixture becomes dry (approximately 5–7 minutes of mixing) and a temperature of approximately 300° to 350° F. has been reached from the highly exothermic reaction which occurs and the water of constitution in the concentrated sulfuric acid has been completely vaporized and has left the reaction container to leave a residue of the final product.

The slag-to-acid ratios may vary from about 1:1 to 19:1. For example, the slag to acid ratios may vary from 1:1 (46.6% $H_2SO_4$) to 11:9 (41.94% $H_2SO_4$) to 3:2 (37.28% $H_2SO_4$) to 13:7 (32.62% $H_2SO_4$) to 7:3 (27.96% $H_2SO_4$) to 3:1 (23.30% $H_2SO_4$) to 4:1 (18.64% $H_2SO_4$) to 9:1 (9.32% $H_2SO_4$) to 19:1 (4.66% $H_2SO_4$).

The products of the present invention possess several very special properties, one of which is having a near total absence of any content of free water. The very small quantity of water present in the slag and concentrated (66° Be) acid used is quickly consumed in the process when the slag particles are brought into intimate contact with the acid. At that time, some of the oxidic silicate compounds present in the slag such as the calcium, magnesium, and ferrous will react with the concentrated acid to form metal sulfate hydrate adsorbates. For example, the calcium and the iron silicate matter will form the di- and penta-hydrates of sulfate salts. This very special desiccative ability is derived from the colloidal and physical attributes of the ingredients including the slag in the presence of the concentrated sulfuric acid, the siliceous matter in the slag with its strong chemical reactability, and the tremendous chemical affinity for hydrolytic activity of the sulfuric acid.

The final products obtained from use of the present process will consist of completely dry, granular, free-flowing, highly acidic chemical compositions composed predominantly of anhydrous, granular mixtures of ferrous iron-calcium-magnesium-aluminum-silico sulfates with physically combined anhydrous sulfuric acid.

When products of this invention are placed in an environment containing moisture (or free water) such as agricultural soils, the anhydrous sulfate salt products undergo hydration. The hydration causes increased volume (expansion) which results in soil beneficiation by causing alteration of soil particles. Similar effects are likewise produced when soil carbonate compounds such as limestone and dolomite react with the sulfuric acid to produce simultaneously both carbon dioxide and water along with metal sulfate hydrate salts. Thus, the products are very effective in providing long term, continuous supplies of sulfate ($SO_4^-$) to maintain optimum levels of available oxygen and to cause optimum aerobic conditions in the soil for bacterial degradation of any organic matter introduced into the product.

As will be apparent from the above, this invention is concerned with the preparation and use of highly adsorbent and acidic chemical compounds which are capable of releasing plant and soil nutrients upon contact of such compounds with moisture present in agricultural soils and surrounding humid atmospheres. Basically, the essence of this invention is providing a near to a total absence in the products of any ionized matter, most especially hydrogen ions. Then, when such products become exposed to moisture ($H_2O$) or to water-containing substances, acid hydrolysis and attendant ionization occurs. Only after this condition of partial hydrolysis has been achieved do the previously anhydrous components of the products demonstrate acid reactivity per se and the achievement of ionization ability. This, in turn, causes a controlled, steady state of continuing hydration and accompanying hydrolytic decomposition as the components of the products slowly become hydrated. This ensures a constant, continuous, and prolonged availability of hydrogen ions to promote and regulate the formation, release, and availability of plant nutrients such as acid sulfate ($HSO_4^-$), acid phosphate ($HPO_4^{-2}$), acid carbonate ($HCO_3^-$), etc., inorganic acidic substances and organic acids such as acetic and humic acids.

To verify the absence of reactable hydrogen ions, and to provide an enhanced soil improving product, a portion of the product is placed in a moisture and water-free container to which powdered limestone ($CaCO_3$) of approximately similar amount is added. After the two ingredients are thoroughly combined, no release of carbon dioxide from the calcium carbonate should be noted due to the total absence of available hydrogen ions.

Incremental amounts of water are then added to the mixture. The release of carbon dioxide will be noted as a result of making hydrogen ions available to produce ionization and permitting the sulfuric acid present to react with the alkaline calcium carbonate with the attendant formation of calcium acid sulfate and calcium acid carbonate as shown in the following equation:

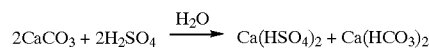

After additional hydration, calcium sulfate dihydrate is formed and carbon dioxide is released as shown in the following equation:

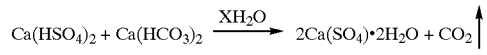

The carbon dioxide is available as a plant nutrient upon leaving the soil environment to be accepted by plant foliage and utilized to form plant carbohydrate. Likewise, ionized calcium is available to enhance the soil and provide plant nutrition along with sulfate sulfur and other nutrients present in such a system.

Similarly, tricalcium phosphate ($Ca_3(PO_4)_2$) powder could be admixed with the acidified slag (with the calcium carbonate or added to a mixture of the acidified slag and calcium carbonate) where, in the absence of water, no chemical reaction requiring ionization can occur. The dry free-flowing mixture could be stored in the total absence of water and remain completely unreactive until brought into contact with moisture or water per se by, for example, being placed in agricultural soil containing a content of available moisture. After being placed in the soil, plant available acid mono phosphate ($H_2PO_4$) and phosphoric acid ($H_3PO_4$) would be formed directly in the soil to which the product had been added. Also, as with other ionic calcium, the calcium of the triple super phosphate having become ionized would be plant-available as a required secondary plant nutrient along with the available forms of phosphorous, a primary plant nutrient.

As the rates of reaction will be dependent upon contents of soil moisture available, products of this nature will have prolonged activity and thus will be longer lasting because of the controlled release when needed by plant life. Numerous similar inorganic compositions will lend their use to these types of reactions as well as numerous organic systems. The consideration of presence or absence of water and available hydrogen and sulfate ions have been noted to make many reactions either succeed or fail. Beneficial side reactions can be made to take place as well as both positive and negative catalytic effects brought into play with the presence or absence of water. This invention permits making either the presence or absence of water possible whereby making a large number and variety of both intermediate and end products possible.

As will be further apparent from the above, the invention is concerned primarily with a newly discovered process for use in converting widely abundant, solid waste materials into highly useful, extremely valuable, and badly needed chemical compounds.

The present invention also contemplates optionally combining the acid with plastic or resin waste or with terpenes prior to mixing the acid with the slag as well as combining the dry granular product with additional chemical compounds. Thus, the raw materials used in this invention are as follows:

(1) slag as produced as a by-product from use of the reverberatory refining process to obtain copper metal from copper pyritic ores;

(2) concentrated sulfuric acid (66° Be—93.17% $H_2SO_4$) obtained as a by-product from conversion into sulfuric acid of the sulfur oxides released in the processing of the copper pyritic ores or as the acid which may be obtained from waste sulfur acid gasses released from similar roasting or burning of sulfur-containing matter, or from several other sources;

(3) optionally plastics and resin wastes known as vinyl compounds including polymerized products such as are obtained from processing acetylene and ethylene including butadiene and substituted butadienes like isoprene as found in both natural and in synthetic rubber products like rubber tires (crumb rubber) and as found in polyethylene plastics such as polyethylene terphthalate used in the manufacture of clear plastic beverage bottles and additional waste plastics composed of polymers of vinyl acetate, acrylic and methacrylic acids, styrene, isobutylene, methyl ketone, etc.;

(4) optionally chemical compounds known as terpenes which are naturally present in substances such as turpentine, alpha and beta pinene and terpinolenes, dipentenes, and terpene hydrocarbon compounds as found in various terpene polymers; and (5) additional chemical compounds having contents of nitrogen, phosphorus, and potassium referred to as chemical fertilizer compounds and plant food chemical compounds like urea, phosphate salts of ammonia, potassium sulfate salts, and similar soil, plant and soil bacterium nutrients.

The pretreatment (and subsequent exposure) of the optional terpenes with the sulfuric acid prior to their introduction into the slag permits some formation of organic sulfonic acid and sulfonates which greatly assists continuing salvation of any additional diene-containing polymeric matter to permit greater chemical reactivity (decomposition, etc.) when the acid mixture is brought into contact with the slag. After this contact, exothermic conditions cause the system to become a dry, free-flowing, solid product without the use of any application of artificial heat.

In contrast to using liquid forms of dilute or maximum concentration sulfuric acid (98.5% $H_2SO_4$) for soil treatment, the solid products of the instant invention have the benefit of being usable in selected acid concentration forms as desired in any soil system. The products provide continual and prolonged release of contents to reduce to near elimination "run off" loss. Moreover, the products do not cause undesirable or uncontrollable problems in treating soils such as creating "hard pan" soil formations as happens with treatment with high content sulfuric acid solutions or with highly concentrated forms of such acid.

There are many additional advantages from the use of the solid products of the invention such as hazard reduction, ease of transporting and handling, reduced overall cost, simplicity of manufacture, low energy consumption, instant availability of raw materials, intangible values relative to conservation, pollution control and waste conversion, and large potential world-wide market (primarily the very large potentials for consumption of unlimited amounts of slag, sulfuric acid, rubber and waste plastics). Thus, the invention may be used to produce an unlimited amount of widely consumable, low cost, variable compositions at tremendous potential profit.

The acidulated slag product with or without a calcium carbonate or other content can be applied directly to the surface of moisturized soils containing carbonate minerals or to mulched soils where the mulch contains moisture and available mineral carbonates. The described acidulated slag product can also be incorporated into soils having contents of carbonate minerals to be a combination fertilizer with a provision for release of carbon dioxide to the immediate atmosphere surrounding plant foliage. The product can further be applied to soils in any manner of condition which will permit the acidulated slag and the carbonate mineral mixture to be contacted by water or vaporized water to promote the necessary hydrolytic reaction and its attendant release of carbon dioxide gas to the immediate atmosphere exposed to plants having foliant carbon dioxide receptivities.

All of these products are dry, free-flowing compositions that can be employed either in combination or interchangeably depending upon the selected end products to be made and their specific usages. In the case of preparing controlled release plant nutrients in order to reduce chemical pollution of waterways from conventional fertilizer run-off, water semi-soluble to water insoluble chemical compounds can be formulated by using such slag-acid compounds present in required amounts employing various ratios of slag-to-acid acidified slag products as noted above. For example, by admixing approximately 30 grams of insoluble rock phosphate (33.3% $P_2O_5$ equivalent) mixed with an equal amount of copper slag with 35 to 40 grams of 66° Be sulfuric acid a dry product can be prepared and introduced into agricultural soils to provide a source of available $P_2O_5$ over a prolonged period. During this period, the product, in the presence of moisture, will be activated to form the monocalcium phosphate ($Ca(H_2PO_4)$) soluble and available phosphatic form. Alternatively, a similar product may be produced by combining and intimately mixing equal amounts of a 3:2 ratio acidulated slag product. The water required to initiate and promote the required degree of continual acid hydrolysis of the phosphate rock can be obtained from soil mixture or, for a quicker degree of hydrolysis, the concerned soils can be moderately irrigated by a spray or other method.

Since the activator of the reaction is water, whether it be introduced by desiccative means, by irrigation, or by any other acceptable means, it must be made present in order to provide for the process of ionization to occur. Controllable release of other primary, secondary, or micro nutrients can be made possible along with providing means for a very large number of chemical compounds to be made available to soil systems by their being included in various formulations with acidulated slag. Substances like terpene alcohols may be introduced into the sulfuric acid before employing such acid for use in the acidulation process to provide beneficial surfactant properties to the products made and to the systems where they are used.

It is highly critical to an understanding of this invention to recognize that it is a matter of choice, not a requirement, to include additional ingredients with either the sulfuric acid or with the pulverized copper slag before or after they are combined in the various ratios noted above to produce anhydrous, dry, solid granules of acidulated slag products.

It is not required, for example if it is desired to make acid-slag products having contents of compounds such as rubber, plastics, resins and other above-named compounds, that the compounds themselves be completely soluble in the sulfuric acid. This is because such compounds are known to be decomposable either by chemical, biological, or combinations of both in the presence, or even in the partial presence, or sometimes even in the total absence, of moisture. It is also not a requirement that the acidulated slag products be anhydrous for their uses unless such products are to be used specifically where their hydrolytic reactivities will control their rates of solubilities to effect specific desired conditions. Such specific desired conditions include controlled evolvement of carbon dioxide, controlled hydrolysis to obtain controlled release of plant nutrients, etc., controlled soil acid reactabilities and similar type reactions which can produce controllable results.

Since the acid-slag products as produced are essentially anhydrous, such products can intentionally be controllably hydrated to several different degrees. The hydration can be used to provide a wide variety of partially hydrated acid-slag products for additional applications such as for controlled defoliation, and for herbicidal, pesticidal, etc. applications in agricultural practices.

The process of the present invention is further illustrated by the following examples:

EXAMPLE 1

Five hundred (500) gms. of crumb rubber is dissolved in 500 gms. of concentrated (66° Be) sulfuric acid which is then added to and thoroughly mixed with 500 gms. of slag (ground to 100% minus 200 mesh U.S. Standard Sieve size) in the absence of any added water to produce 1330 gms. of dry, free-flowing product.

EXAMPLE 2

Two hundred fifty (250) gms. of clear plastic beverage bottle (polyetheneterphthalate plastic) ground to 100% minus 40 mesh U.S. Standard Sieve size is dissolved in 500 gms. of concentrated 66° Be (93.17% $H_2SO_4$) sulfuric acid containing 150 gms. of 85% $H_3PO_4$ content orthophosphoric acid and 150 gms. of urea (45% N content) which is then added to and admixed with 500 gms. of pulverized slag to produce 1500 gms. of dry, free-flowing product without addition of heat energy.

EXAMPLE 3

Experimentation shows that approximately 98 grams of an acidulated, dry product made by combining 65 gms. of pulverized copper slag and 35 gms. of 66° Be sulfuric acid (93.17% $H_2SO_4$) is capable of more-or-less absorbing 33.60 gms. of moisture (water vapor or $H_2O$) from a humidified atmosphere over a ten week period (1680 hours). Evaluations made each 24 hour time period show weight gains ranging from 0.0198 to 0.0202 gms. for an average of 0.0200 gms. per each one hour of moisture absorption. Further experimentation shows that, when the initial product described above is made to contain an equivalence of about 36 gms. of calcium carbonate, then exposed to humidified atmospheres, the absorption of an approximately 6.5 gms. of water takes place to promote the required acid hydrolysis reaction to cause decomposition of the calcium carbonate with the attendant release of approximately 16 gms. of carbon dioxide gas.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

I claim:

1. A process for making a soil fertilizing and soil improving product comprising the steps of:
    a) intimately mixing a pulverized waste copper slag obtained from the reverberatory refining of copper ore with concentrated sulfuric acid having a strength, by weight, of about 93.17% $H_2SO_4$ in the absence of water other than present in the pulverized waste copper slag and the concentrated sulfuric acid; acid at a slag-to-acid ratio of about 3:2 to 19:1 and
    b) allowing said slag-acid mixture to react to form a dry granular product which is substantially anhydrous and contains sufficient quantities of acid.

2. The process of claim 1 wherein the slag will pass a 200 mesh U.S. Standard Sieve screen.

3. The process of claim 1 wherein the dry granular product is a mixture of ferrous iron-calcium-magnesium-aluminum-silico sulfates with physically combined anhydrous sulfuric acid.

4. The process of claim 1 wherein the slag is mixed with the acid for about 5–7 minutes.

5. The process of claim 1 wherein the slag is mixed with the acid until a temperature of about 300 to 350° F. has been reached.

6. The process of claim 1 wherein the dry granular product is substantially devoid of ionized matter.

7. The process of claim 1 wherein an ionic calcium containing compound is added to the dry granular product.

8. The process of claim 1 wherein the acid is combined with plastic or resin waste or terpenes prior to being mixed with the slag.

9. The process of claim 1 wherein the process further comprises partially hydrating the dry granular product.

10. A process for making a soil fertilizing and soil improving product comprising the steps of:
    a) intimately mixing a pulverized waste copper slag obtained from the reverberatory refining of copper ore with concentrated sulfuric acid having a strength, by weight, of about 93.17% $H_2SO_4$ in the absence of water other than present in the pulverized waste copper slag and the concentrated sulfuric acid at a slag-to-acid ratio of about 3:2 to 19:1 until a temperature of about 300 to 350° F. has been reached; and
    b) allowing said slag-acid mixture to react to form a dry granular product which is substantially anhydrous, contains quantities of acid and is substantially devoid of ionized matter.

11. The process of claim 10 wherein the slag will pass a 200 mesh U.S. Standard Sieve screen.

12. The process of claim 10 wherein an ionic calcium containing compound is added to the dry granular product.

13. The process of claim 10 wherein the acid is combined with plastic or resin waste or terpenes prior to being mixed with the slag.

14. The process of claim 10 wherein the process further comprises partially hydrating the dry granular product.

15. A process for making a soil fertilizing and soil improving product comprising the steps of:
   a) intimately mixing a pulverized waste copper slag obtained from the reverberatory refining of copper ore with concentrated sucture acid having a strength, by weight, of 93.17% $H_2SO_4$ in the absence of water other than present in the pulverized waste copper slag and the concentrated sulfuric acid at a slag-to-acid ratio of 3:2 to 19:1 until a temperature of 300 to 350° F. has been reached; and
   b) allowing said slag-acid mixture to react in the absence of said water to form a dry granular product which is substantially anhydrous and is substantially devoid of ionized matter.

16. The process of claim 15 wherein the slag-to-acid ratio is 11:9 to 19:1.

17. The process of claim 15 wherein the acid is combined with plastic or resin waste or terpenes prior to being mixed with the slag.

* * * * *